US007650773B2

(12) United States Patent
Shikano et al.

(10) Patent No.: US 7,650,773 B2
(45) Date of Patent: Jan. 26, 2010

(54) METHOD FOR MANUFACTURING AN EDGE PROTECTOR AND DIE ASSEMBLIES THEREFOR

(75) Inventors: Fumihiko Shikano, Wako (JP); Keizo Matsumoto, Wako (JP); Tsugio Saito, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 50 days.

(21) Appl. No.: 12/155,215

(22) Filed: May 30, 2008

(65) Prior Publication Data

US 2009/0044592 A1    Feb. 19, 2009

(30) Foreign Application Priority Data

Jul. 24, 2007    (JP)    ............................... 2007-192486

(51) Int. Cl.
*B21D 5/16*    (2006.01)
*B21D 13/10*    (2006.01)

(52) U.S. Cl. ........................... 72/382; 72/307; 72/389.1; 72/389.3; 72/414; 29/889.72

(58) Field of Classification Search .................. 72/307, 72/382, 379.2, 389.1, 389.2, 389.3, 389.6, 72/414; 29/88.729
See application file for complete search history.

(56) References Cited

U.S. PATENT DOCUMENTS

| | | | | |
|---|---|---|---|---|
| 2,473,533 A | * | 6/1949 | Lebedeff | 72/382 |
| 3,044,152 A | * | 7/1962 | Stalker | 29/889.72 |
| 3,045,327 A | * | 7/1962 | Clarke et al. | 29/889.72 |
| 3,045,967 A | * | 7/1962 | Clarke et al. | 29/889.72 |
| 3,057,393 A | * | 10/1962 | Clarke | 72/382 |
| 3,838,590 A | * | 10/1974 | Van Dijk | 72/307 |
| 3,954,218 A | * | 5/1976 | van Dijk | 228/173.1 |
| 5,099,675 A | * | 3/1992 | Heath | 72/382 |
| 5,168,741 A | * | 12/1992 | Braunheim et al. | 72/414 |
| 5,277,052 A | * | 1/1994 | Braunheim et al. | 72/414 |
| 5,501,094 A | * | 3/1996 | Mizuta et al. | 72/382 |

FOREIGN PATENT DOCUMENTS

JP        2006-307698        11/2006

* cited by examiner

*Primary Examiner*—David B Jones
(74) *Attorney, Agent, or Firm*—Squire, Sanders & Dempsey L.L.P.

(57) ABSTRACT

In primary press forming process, a piece of blank sheet metal is draw worked so as to form a preformed work piece (Wb) provided with a bent portion (a) substantially conforming to a three dimensional contour of a leading edge of a blade to be protected and extending along a longitudinal direction, and a pair of planar portions (b and c) extending from either side of the bent portion. In a secondary press forming process, the planar portions (b and c) of the preformed work piece are stretch formed into a final shape that conforms to the corresponding profile of the blade while the bent portion (a) of the preformed work piece is clamped and protected from deformation. In other words, the bent portion of an edge protector (100) is already given with the final shape of the edge protector by the primary press forming process while the planar portions (b and c) thereof are given with the final shape by the secondary press forming process so that the two press forming processes can be executed without interfering with each other, and only two relatively simple press forming processes are required for forming the complex three dimensional shape of the edge protector.

18 Claims, 7 Drawing Sheets

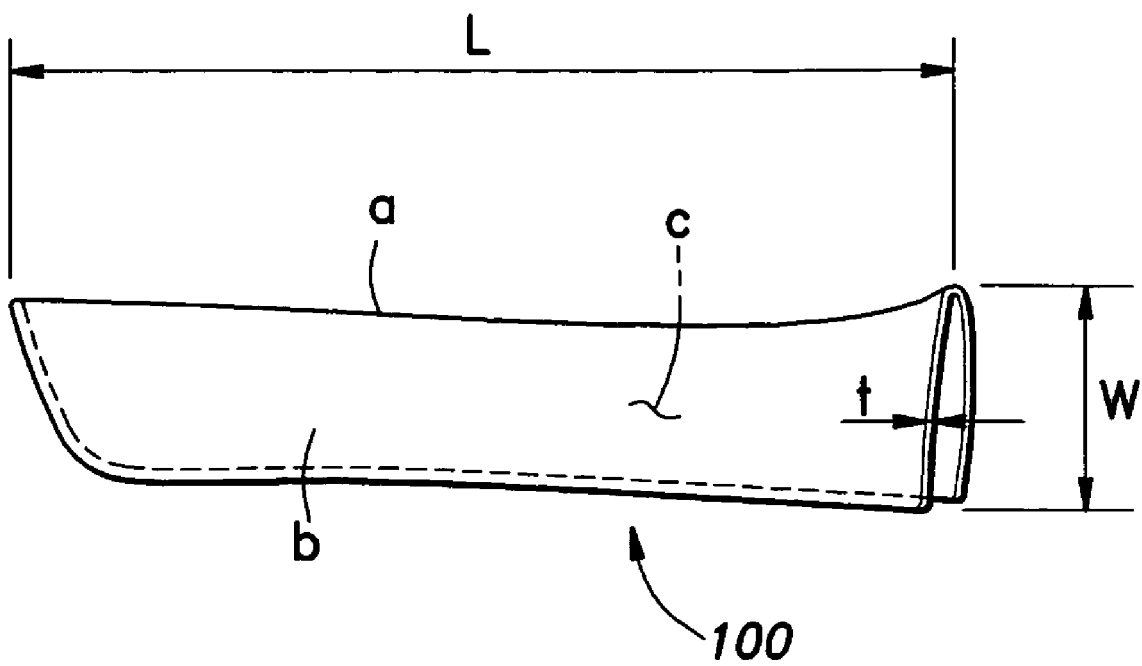

METHOD FOR MANUFACTURING AN EDGE PROTECTOR AND DIE ASSEMBLIES THEREFOR

TECHNICAL FIELD

The present invention relates to a method for manufacturing an edge protector and die assemblies therefor, and in particular to a technology for manufacturing an edge protector for protecting a leading edge of a blade such as a stator fan blade of a gas turbine engine or a turbo jet engine which is given with a three dimensional configuration.

BACKGROUND OF THE INVENTION

It has been proposed to use composite material such as fiber reinforced resin and carbon reinforced material for stator fan blades of gas turbine engines and turbo jet engines. See Japanese patent laid open publication No. 2006-307698. A blade made of such composite material has a higher mechanical strength and toughness than other more conventional metallic materials for the given weight, but is known to be more prone to chipping or cracking. In particular, when an aircraft is on the ground, sands and gravels that could be ingested into the engine may be impinged upon the leading edges of the blades of the stator fan, and this could cause damages to the blades.

As a countermeasure against such a problem, it has been practiced to attach an edge protector made of sheet metal and given with a U-shaped cross section on the leading edge of each blade. The blades of stator fans for more conventional turbo jet engines used to be given with relatively simple two dimensional configurations, but those for more recently developed engines are given with more complex three dimensional configurations for the purpose of achieving a higher engine efficiency. The edge protectors for such stator fan blades are required to be formed with corresponding three dimensional configurations. Therefore, conventional press forming processes for fabricating edge protectors of two dimensional configurations have become inadequate for fabricating edge protectors having three dimensional configurations.

The processes for fabricating such three dimensional edge protectors include machining, electroforming, hydro-forming and progressive press forming processes. However, these processes have some problems. The electroforming process enables an edge protector to be formed in a highly precise manner, but is a both a time consuming and expensive process. The hydro-forming is only suitable for forming sheet metal having a relatively large thickness, and is not suitable for forming the thin sheet metal which is typically used for edge protectors. Also, a high precision may not be achieved, and the manufacturing cost is relatively high. The progressive press forming process requires a large number of press forming steps, and is highly expensive because of a need for a large number of die assemblies. Also, this is not particularly suitable for forming a three dimensional work piece at a high precision.

BRIEF SUMMARY OF THE INVENTION

In view of such problems of the prior art, a primary object of the present invention is to provide a method for manufacturing an edge protector which is capable of fabricating a three dimensional edge protector at a high precision both efficiently and economically.

According to the present invention, such an object can be accomplished by providing a method for drawing sheet metal into an edge protector including a bent portion and a pair of planar portions conforming to a leading edge and a pair of lateral sides of a blade to be protected, respectively, the leading edge being given with a three dimensional contour, comprising: press forming a piece of planar sheet metal into a preformed work piece having a U-shaped cross section by using a primary die assembly, the preformed work piece being provided with a bent portion extending along a longitudinal direction and a pair of planar portions extending from either side of the bent portion, the bent portion being given with a contour that conforms to the leading edge of the blade to be protected; preparing a secondary die assembly including a punch including an upper edge portion and a pair of lateral sides conforming to the leading edge and lateral sides of the blade to be protected, respectively, at least a pair of lateral die blocks configured to cooperate with the lateral sides of the punch to shape the planar portions of the preformed work piece so as to conform to the lateral sides of the blade to be protected and an upper clamp member including a recess conforming to an outer contour of the bent portion of the preformed work piece and configured to clamp the bent portion of the preformed work piece in cooperation with the upper edge portion of the punch; placing the preformed work piece onto the punch and clamping the preformed work piece between the upper edge portion of the punch and the recess of the upper clamp member; pushing the lateral die blocks onto the planar portions of the preformed work piece against the corresponding lateral sides of the punch; and opening the secondary die assembly to take out the finally press formed work piece as a finished edge protector.

Preferably, the primary die assembly comprises an upper die holder and a lower die holder disposed opposite to each other and configured to be selectively moved toward and away from each other; a punch mounted on the lower die holder and including an upper edge that is configured to form a substantially final configuration of the bent portion of the edge protector; a blank holder having an opening to pass the punch therethrough and a clamping surface for clamping the blank sheet metal at parts corresponding to free ends of the planar portions of the edge protector; at least a pair of lateral die blocks supported by the upper die holder so as to be slidable toward and away from lateral sides of the punch; springs resiliently urging the die blocks toward each other; and actuators for causing movements of the upper die holder and lower die holder relative to each other.

The blank sheet metal is placed on an upper surface of the blank holder so that a part of the blank sheet metal corresponding to the bent portion of the preformed work piece is aligned with the upper edge portion of the punch, and planar portions of the preformed work piece extending from either side of the part corresponding to the bent portion are each squeezed toward a base end of the punch between the corresponding lateral side of the punch and the corresponding lateral die block while the upper die holder along with the lateral die blocks are moved downward and the lateral die blocks are resiliently pushed toward the punch under a spring force of the spring.

According to a preferred embodiment of the present invention, the blank holder of the primary die assembly comprises draw beads formed on an upper surface thereof for resiliently clamping the planar portions of the preformed work piece in cooperation with notches provided in the die blocks.

According to a particularly preferred embodiment of the present invention, the secondary die assembly further comprises an upper die holder and a lower die holder disposed opposite to each other and configured to be selectively moved toward and away from each other, the upper die holder supporting the upper clamp member, the lower die holder supporting the punch and lateral die blocks, and actuators for causing movements of the upper die holder and lower die holder relative to each other, and the lateral die blocks toward and away from the punch.

So as to accommodate the lateral movement of the punch and evenly distribute the force applied by the lateral clamp block onto the punch, the upper clamp block may be supported by the upper die holder so as to be laterally moveable relative to the upper die holder, and/or the punch may be supported by the lower die holder so as to be laterally moveable relative to the lower die holder.

To favorably stretch form the planar portions of the preformed work piece into the final shape, it is important to firmly clamp the free ends of the planar portions of the preformed work piece when pressing the lateral clamp blocks onto the lateral sides of the punch. For this purpose, the secondary die assembly may further comprise a pair of lateral clamp members configured to push free ends of the planar portions of the preformed work piece against a base portion of the punch; and actuators for actuating the lateral clamp members toward and away from the base portion of the punch, and the base portion of the punch and each of the clamp members may abut each other via a complementary projection and groove engagement.

According to a preferred embodiment of the present invention, the upper die holder comprises a spring member for resiliently urging the upper clamp block against the upper edge of the punch so that the bent portion of the preformed work piece may be clamped at an optimum force by using a highly simple structure.

The present invention also provides a primary die assembly and a secondary die assembly which are suited to implement the method of the present invention.

According to the present invention, in the primary press forming process, the blank sheet metal is draw worked so as to form the curved bent portion a that conforms to the leading edge of the blade while the planar portions b and c are given with a substantially straight configuration so that the a preformed work piece Wb having an approximately U-shaped cross section may be produced. In the secondary press forming process, the planar portions b and c of the preformed work piece are stretch formed into a final shape that conforms to the corresponding profile of the blade while the curved bent portion a of the preformed work piece is clamped and protected from deformation. In other words, the bent portion of the edge protector is already given with the final shape by the primary press forming process while the planar portions thereof are given with the final shape by the secondary press forming process. Therefore, the two press forming processes can be executed without interfering with each other, and only two relatively simple press forming processes are required for forming the complex three dimensional shape of the edge protector.

BRIEF DESCRIPTION OF THE DRAWINGS

Now the present invention is described in the following with reference to the appended drawings, in which:

FIG. 7 is a perspective view of a typical edge protector that can be fabricated with the method of the present invention.

DETAILED DESCRIPTION OF THE PREFERRED EMBODIMENTS

A method for manufacturing an edge protector and die assemblies for performing such a method embodying the present invention are described in the following with reference to FIGS. 1 to 6. As illustrated in FIG. 7, the edge protector 100 that is desired to be manufactured is made of a stainless steel sheet having a thickness t of about 0.1 mm, a total length L of about 30 to 300 mm, and a width W of about 5 to 30 mm, and is given with a U-shaped cross section that includes a bent portion a and a pair of planar portions b and c. The bent portion a is given with a three dimensional inner contour that closely fits the outer contour of the leading edge of a blade (aerofoil) which is desired to protected, and the planar portions b and c are also slightly curved so as to conform to the corresponding lateral sides of the blade.

Figure 1:
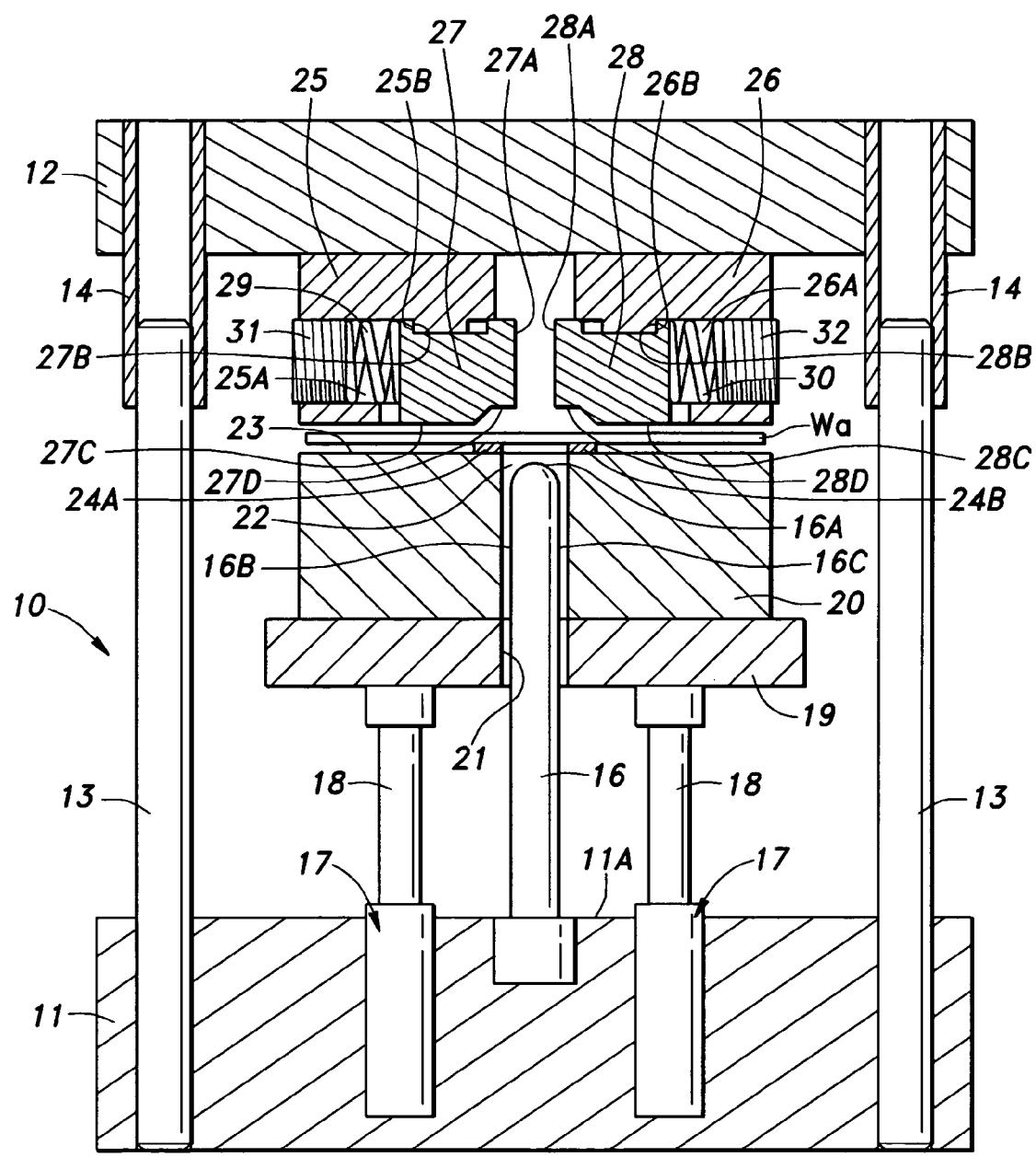
FIG. 1 is a vertical sectional view of the primary press die assembly embodying the present invention with the upper die holder at the uppermost position.
Figure 2:
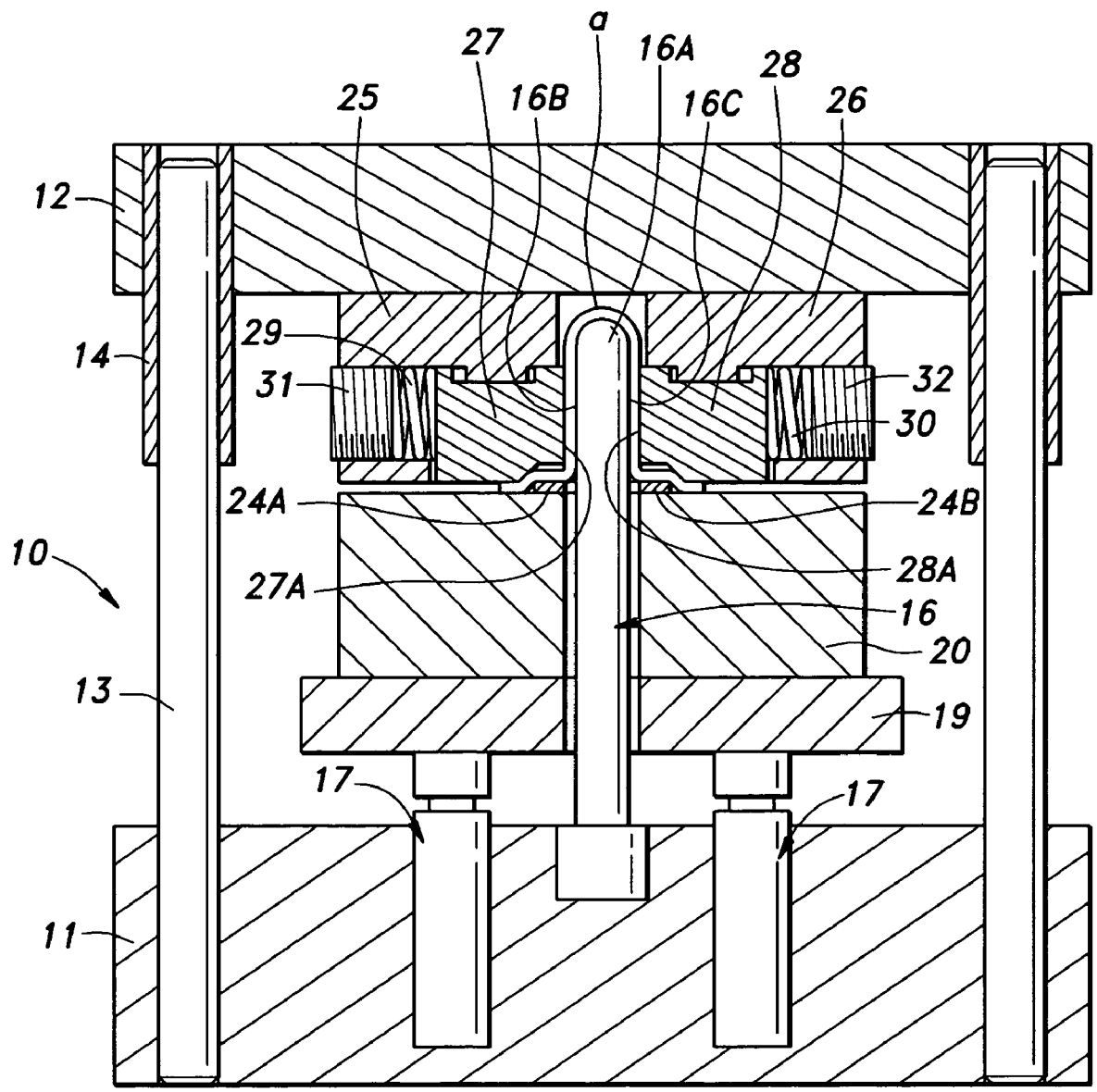
FIG. 2 is a vertical sectional view of the primary press die assembly with the upper die holder at the lowermost position.

The method of manufacturing the edge protector 100 is now described in the following. Referring to FIGS. 1 and 2, a piece of blank sheet metal Wa made of stainless steel is cut into a prescribed size, and is set on a primary press die assembly 10, and is draw worked so as to form the curved bent portion a that conforms to the leading edge of the blade while the planar portions b and c are given with a substantially straight configuration so that the a preformed work piece Wb having an approximately U-shaped cross section may be produced.

Figure 3:
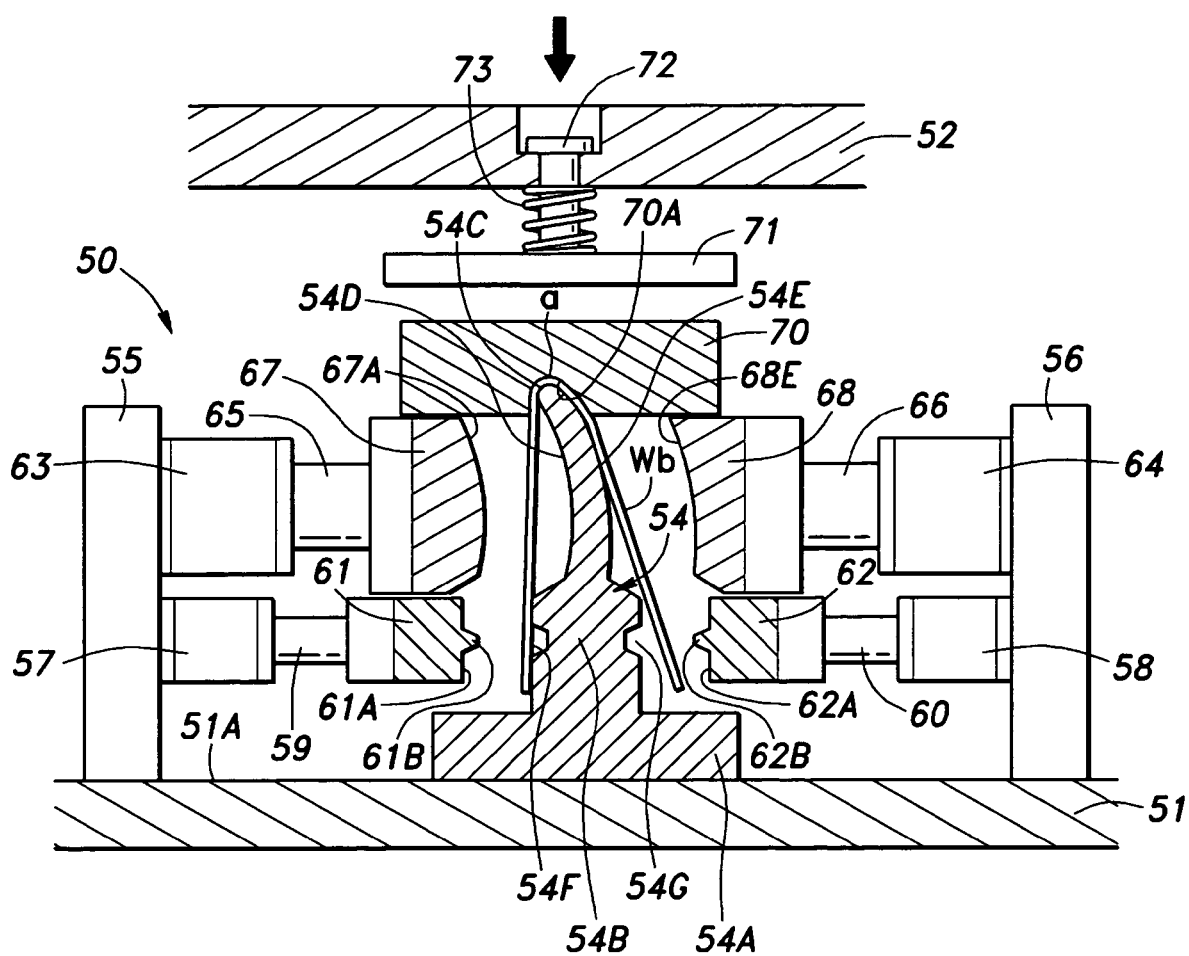
FIG. 3 is a vertical sectional view of the secondary press die assembly embodying the present invention at an initial position.
Figure 5:
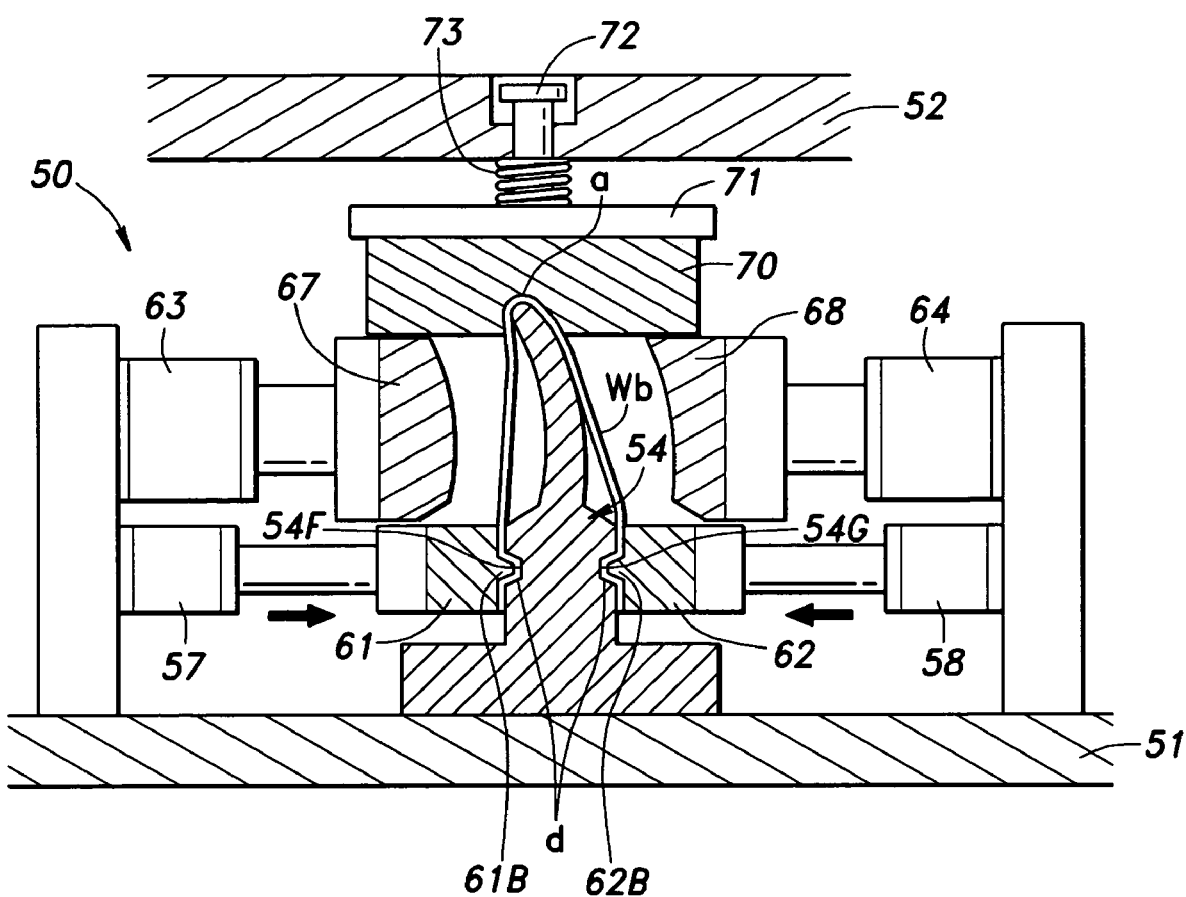
FIG. 5 is a vertical sectional view of the secondary press die assembly at a second intermediate position.

Referring to FIGS. 3 and 5, the preformed work piece Wb that has been draw worked by using the primary die assembly 10 is set on a secondary press die assembly 50 to stretch form the planar portions b and c into a final shape that conforms to the corresponding profile of the blade while the curved bent portion a of the preformed work piece Wb is protected from deformation. In other words, the bent portion of the edge protector 100 is already given with the final shape by the primary press forming process while the planar portions thereof are given with the final shape by the secondary press forming process.

The primary die assembly 10 comprises a lower die holder 11 and an upper die holder 12 that oppose each other. A plurality of guide posts 13 extending in a vertical direction are fixedly attached to the lower die holder 11, and a corresponding number of guide sleeves 14 are fixedly attached to the upper die holder 12 in such a manner that the guide sleeves 14 slidably receive the guide posts 13 as the lower die holder 11 and upper die holder 12 move toward and away from each other along a prescribed axial line under an actuating force of a hydraulic or electric actuator not shown in the drawings. The lower die holder 11 is attached to a bolster of a press machine not shown in the drawing as it is per se well known in the art while the upper die holder 12 is attached to the moveable ram of the press machine.

The upper surface of the lower die holder 11 defines a punch mount surface 11A onto which a punch 16 is fixedly attached by using threaded bolts (not shown in the drawings) in a vertical orientation. The punch 16 is given with a planar shape having a lateral length (as measured in a direction perpendicular to the paper of the FIGS. 1 and 2) somewhat greater than the total length L of the edge protector 100. The two (vertical) sides extending in parallel to a major plane of the punch die 16 are given with planar surfaces while the upper edge thereof is given with a curved contour substantially conformal to the leading edge of the blade to be protected. This curved contour of the upper edge of the punch die 16 may not be exactly conformal to the leading edge of the blade, but may be slightly modified so as to take into account the spring back of the material at the time of the draw working process. The same is true with the contours of the surfaces involved in the various press forming processes, and the terms "conform" and "conformal" should be interpreted as covering or accommodating any deviations from pure "conform" and "conformal" to take into account spring back of the material.

To the lower die holder 11 are mounted a plurality of gas-filled springs 17 in a vertical orientation. Each gas-filled spring 17 has a piston rod 18 whose upper end supports a mount plate 19. A blank holder 20 is mounted on the mount plate 19 by using threaded bolts not shown in the drawings. Therefore, the blank holder 20 and mount plate 19 are supported by the gas-filled springs 17 in a horizontal orientation and in a vertically moveable manner.

The mount plate 19 and blank holder 20 are provided with openings 21 and 22, respectively, which are large enough to receive the punch die 16 therein. More specifically, the openings 21 and 22 are so dimensioned as to permit the punch die 16 pass the inner walls of the openings 21 and 22 without touching them.

The upper surface of the blank holder 20 may be curved along the direction perpendicular to the paper of the drawings so as to conform to the contoured upper edge 16A of the punch die 16 which may be curved along the length thereof corresponding to the lengthwise direction of the edge protector 100, and the upper surface of the blank holder 20 defines a blank support surface 23 for initially supporting the blank sheet metal Wa. The blank holder 20 is additionally given with the function to prevent the creasing of the blank, and is provided with a pair of drawing beads 24A and 24B on the parts of the blank support surface 23 extending along either side of the opening 22.

On the lower surface of the upper die holder 12 are mounted a pair of die retaining members 25 and 26 in a laterally spaced relationship by using threaded bolts (not shown in the drawings). The die retaining members 25 and 26 support corresponding die blocks 27 and 28 in a laterally slidable manner toward and away from each other. A free end surface 27A, 28A of each die block 27, 28 is defined by a vertical surface that opposes the corresponding lateral side surface of the punch 17 as the upper die holder 12 moves downward. The corner between the free end surface 27A, 28A and the lower bottom surface 27C, 28C of each die block 27, 28 is provided with a cutout 27D, 28D approximately conforming in shape to the corresponding draw bead 24A, 24B.

Each die retaining member 25, 26 is provided with a spring receiving hole 25A, 26A which receives a compression coil spring 29, 30. Each compression coil spring 29, is interposed between a back surface of the corresponding die block 27, 28 and a free end surface of an adjust screw 31, 32 threadably received in the corresponding die retaining member 25, 26 to resiliently urge the corresponding die block 27, 28 against the corresponding side of the punch 16 in an adjustable manner.

The most advanced positions of the die blocks 27 and 28 under this spring force are defined by stopper surfaces 27B and 28B formed in the die blocks 27 and 28 engaging corresponding stopper surfaces 25B and 26B formed in the corresponding die retaining members 25 and 26, respectively (as illustrated in FIG. 1). The lateral space between the front end surfaces 27A and 28A of the die blocks 27 and 28 in their most advanced positions is determined to be slightly smaller than the lateral dimension (width) between the two side faces of the punch 16.

The most advanced positions of the die blocks 27 and 28 may also be defined 31 by providing retainer bolts on the side of the die blocks so as to limit the permitted ranges of displacements of the back and forth movements of the die blocks 27 and 28. The spring forces of the compression coil springs 29 and 30 can be adjusted by turning the corresponding adjust screws 31 and 32.

In the primary press forming process using the primary press die assembly 10, with the upper die holder 12 at the uppermost position (initial state) as shown in FIG. 1, a piece of blank sheet metal Wa is placed on the blank support surface 23 of the blank holder 20 or, more specifically, on the draw beads 24A and 24B. At this stage, the upper end 16A of the punch 16 is still within the opening 22 of the blank holder 20, and does not project from the blank support surface 23.

The upper die holder 12 is then lowered by the actuator not shown in the drawings until the lower bottom surfaces 27C and 28C the die blocks 27 and 28 push the blank sheet metal Wa against the blank support surface 23 and draw beads 24A and 24B. Thereby, the blank sheet metal Wa is held in position by being interposed between the blank holder 20 and the die blocks 27 and 28.

As the upper die holder 12 is lowered further, the mount plate 19 and blank holder 20, as well as the die blocks 27 and 28, are pushed downward while compressing the gas-filled springs 17 against the spring force thereof. As the spring force of the gas-filled springs 17 acts upon the blank holder 20 in this manner, the holding pressure applied by the blank holder 20 and the die blocks 27 and 28 onto the blank sheet metal Wa can determined at an appropriate level and can be evenly distributed.

As the blank holder 20 is pushed further downward, the (laterally) central part of the blank sheet metal Wa comes into engagement with the upper end 16A of the punch 16. The die blocks 27 and 28 and blank holder 20 are then further moved downward with the blank sheet metal Wa kept held by the die blocks 27 and 28 so that the blank sheet metal Wa is pushed against the upper end 16A of the punch 16, and the punch 16 along with the blank sheet metal Wa is pushed into the space between the free end surfaces 27A and 28A of the die blocks 27 and 28 and pushes the die blocks 27 and 28 away from each other.

As a result, the free end surfaces 27A and 28A of the die blocks 27 and 28 are pushed onto the blank sheet metal Wa against the lateral sides 16B and 16C of the punch 16 or the blank sheet metal Wa is squeezed against the lateral sides of the punch 16 toward a base end of the punch 16 while the blank sheet metal Wa is pushed against the two lateral side surfaces 16B and 16C of the punch 16 under the spring force of the compression coil springs 29 and 20 so that the blank sheet metal Wa is draw worked to the U-shaped cross sectional shape with a zero clearance.

In the primary press forming process, the bent portion a of the blank sheet metal Wa corresponding to the leading edge of a blade is formed by conforming it to the upper edge 16A of the punch 16, but the planar portions b and c of the blank sheet metal Wa adjoining the bent portion a are simply lightly pressed against the two planar side surfaces of the punch 16 and the planar portions b and c which are to be formed on either side of the bent portion a are not draw worked. In other words, in the primary press forming process, the planar portions b and c are not formed into the final three dimensional contours but only into simple planar configurations. The upper die holder 12 is then lowered to a lowermost position, and presses upon the blank sheet metal Wa at a prescribed pressure. The upper die holder 12 is then raised back to the original position, and the blank sheet metal Wa is removed from the primary die assembly 10 as a preformed work piece Wb. This concludes the primary press forming process.

The primary press forming process finally determines the three-dimensional contour of the bent portion a which conforms to the shape of the leading edge of the blade.

The pressure applied to the holder 20 can be appropriately selected by using gas-filled springs 17 of corresponding specifications. The slippage in the blank material during the primary press forming process can be controlled so as to occur evenly by suitably selecting the widths and heights of the draw beads 24A and 24B, and this contributes to the prevention of creasing of the blank sheet metal Wa during the primary press forming process.

As the draw working process is performed with a zero clearance between the work piece and die assembly, the accuracy in the configuration of the bent portion can be increased and the prevention of creasing can be achieved. Also, excessive thinning of the blank sheet metal Wa can be avoided, and this also contributes to the improvement in the accuracy in the configuration of the bent portion A secondary press forming process and a secondary press forming die assembly 50 for use therein are described in the following with reference to FIGS. 3 to 6.

The secondary press forming die assembly 50 comprises a lower die holder 51 and an upper die holder 52 which are disposed opposite to each other. The lower die holder 51 is fixedly attached to a bolster of a press forming machine not shown in the drawings. The hydraulic or electric actuator for causing the relative movement between the lower die holder 51 and upper die holder 52 is not shown in the drawing. If desired, a same press machine may be used for the two press forming processes by changing the necessary parts of the primary die assembly and secondary assembly.

On a punch mount surface 51A defined on an upper surface of the lower die holder 51 is supported a punch 54 in a laterally (horizontally) slidable manner. The punch 54 is given with a planar shape having a lateral length (as measured in a direction perpendicular to the paper of the FIGS. 3 to 5) somewhat greater than the total length L of the edge protector 100. The punch 54 comprises a base flange 54A which extends laterally and sits on the die mount surface 51A, a punch base 54B extending upright from the upper end of the base flange 54A, a main body including an upper edge 54C corresponding in shape to the leading edge of the blade to be protected and a pair of lateral side faces 54D and 54E each given with a three-dimensional contour corresponding in shape to the corresponding side face of the vane. The side faces 54D and 54E are given with surface contours that are capable of forming the preformed work piece Wb into the desired shapes by taking into account the spring back of the material of the preformed work piece Wb.

The upper edge 54C of the punch 54 is not different in shape from the upper edge 16A of the punch 16 of the primary press forming die assembly 10.

An upright side plate 55, 56 is fixedly mounted on the lower die holder 51 on each lateral side of the punch 54. Each upright side plate 55, 56 is provided with a pair of hydraulic cylinders 57, 63; 58, 64 in a horizontal orientation one above the other in a mutually spaced relationship. More specifically, piston rods 59 and 65 of the pair of hydraulic cylinders 57 and 63 mounted on one of the upright side plates 55 oppose corresponding piston rods 60 and 66 of the other pair of hydraulic cylinders 58 and 64 mounted on the other of the upright side plates 56 with the punch 54 flanked by them. The free ends of the piston rods 59 and 60 extending from the lower cylinders 57 and 58 are fitted with clamp member 61 and 62, respectively, and the free ends of the piston rods 65 and 66 extending from the upper cylinders 63 and 64 are fitted with die blocks 67 and 68, respectively.

The clamp members 61 and 62 fitted on the free ends of the piston rods 59 and 60 of the lower pair of hydraulic cylinders 57 and 58, respectively, oppose the corresponding sides of the punch base 54B, and can be actuated by the hydraulic cylinders 57 and 58 so that the free ends of the two planar portions of the preformed work piece Wb are pushed against the corresponding sides of the punch base 54B. The free end 61A, 62A of each side clamp member 61, 62 is provided with a projection 61B, 62B that fits into a complementary groove 54F, 54G formed in the corresponding side of the punch base 54B.

The piston rods 65 and 66 of the upper pair of hydraulic cylinders 63 and 64 also oppose each other interposing the punch 54 between them, and the die blocks 67 and 68 fixedly attached to the free ends of the piston rods 65 and 66, respectively, oppose the corresponding side faces of the punch 54. The free end surfaces of the die blocks 67 and 68 are formed as contoured end surfaces 67A and 68A which are complementary in shape to the three dimensional contour of the planar portions of the finished edge protector. The die blocks 67 and 68 are actuated by the hydraulic cylinders 63 and 64, respectively, and configured to perform a three dimensional stretch forming process by pushing the planar portions of the preformed work piece Wb against the corresponding side faces of the punch 54.

To a lower surface 52A of the upper die holder 52 is attached an upper clamp holding plate 71 via a rod 72 fixed to the upper clamp holding plate 71 and slidably received in an opening of the upper die holder 52. The upper clamp holding plate 71 is resiliently urged downward by a compression spring 73 wound around the rod 72 and interposed between the upper die holder 52 and upper clamp holding plate 71. An upper clamp member 70 is placed on upper surfaces of the die blocks 67 and 68, and is provided with a recess 70A in a lower surface thereof which is configured to receive the upper edge of the punch 54 with the bent portion a of the blank plate Wb interposed between them. The recess 70A is complementary in shape to the outer contour of the bent portion c of the preformed work piece Wb.

Therefore, as the upper die holder 52 is actuated downward by a hydraulic cylinder or the like not shown in the drawings, the upper clamp holding plate 71 resiliently pushes the upper clamp member 70 against the upper edge 54C of the punch 54 while the bent portion c of the preformed work piece Wb is interposed between the recess 70A and the upper edge 54C of the punch 54. The upper clamp member 70 is moveable along the lower surface of the upper clamp holding plate 71 with respect to the upper clamp holding plate 71.

The secondary press forming process using the secondary press forming die assembly starts with trimming excess parts from the preformed work piece Wb, putting the upper die holder 52 at the uppermost position and placing the preformed work piece Wb on the punch 54 so as to straddle over the punch 54. As a result, the bent portion of the preformed work piece Wb closely fits onto the upper edge 54C of the punch 54 while the planar portions b and c of the preformed work piece Wb extend along the lateral sides of the punch 54. The free (lower) ends of the planar parts b and c extend downward at least beyond the groove 54F and 54G formed in the punch base 54B.

Figure 4:
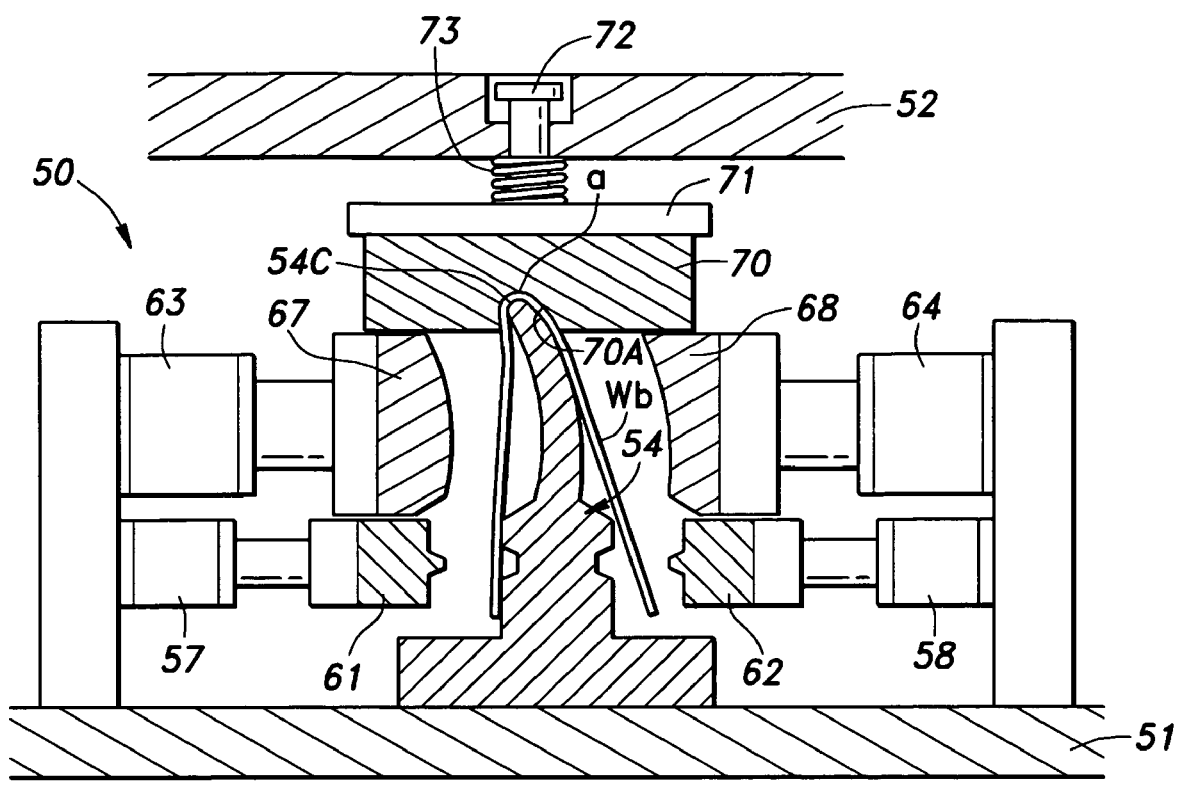
FIG. 4 is a vertical sectional view of the secondary press die assembly at a first intermediate position.

Thereafter, as shown in FIG. 4, the upper die holder 52 is lowered so that the recess 70A of the upper clamp member 70 is resiliently pushed onto the bent portion a of the preformed work piece Wb which is in turn supported by the upper edge 54C of the punch 54. As a result, the bent portion a of the preformed work piece Wb is closely interposed between the upper edge 54C of the punch 54 and the recess 70A of the upper clamp member 70, and is thereby fixedly retained. This retaining action is effected at a relatively small force so as not to cause any substantial plastic deformation to the bent portion a.

When pushing the recess 70A of the upper clamp member 70 onto the bent portion a of the preformed work piece Wb set on the punch 54, because the punch 54 is moveable along the plane of the die mount surface 51A of the lower die holder 51 with respect to the lower die holder 51 and the upper clamp member 70 is moveable along the plane of the lower surface 52A of the upper die holder 52 with respect to the upper die holder 52, such movements of the punch 54 and upper clamp member 70 caused by the three dimensional contour of the bent portion of the preformed work piece Wb placed on the punch 54 can be accommodated. As a result, the bent portion a of the preformed work piece Wb is evenly supported by the recess 70A of the upper clamp member 70, and is prevented from any undesired deformation.

Then, as shown in FIG. 5, the lower side clamp members 61 and 62 are actuated toward each other by the corresponding hydraulic cylinders 57 and 58 until the free ends 61A and 62A of the side clamp members 61 and 62 abut the free end portions (lower end portions in the drawings) of the planar portions of the preformed work piece Wb and push them toward the corresponding side faces of the punch base 54B. As a result, the projections 61B and 62B on the free ends 61A and 62A of the side clamp members 61 and 62 are forced into the corresponding complementary grooves 54F and 54G formed in the punch base 54B with the free end portions of the planar portions of the preformed work piece Wb interposed between them.

This causes the free end portions of the planar portions of the preformed work piece Wb to be firmly clamped between the punch base 54B and the side clamp members 61 and 62, and blank holder beads d to be formed in the free end portions of the planar portions b and c of the preformed work piece Wb owing to the cooperation between the projections 61B and 62B and complementary grooves 54F and 54G.

Figure 6:
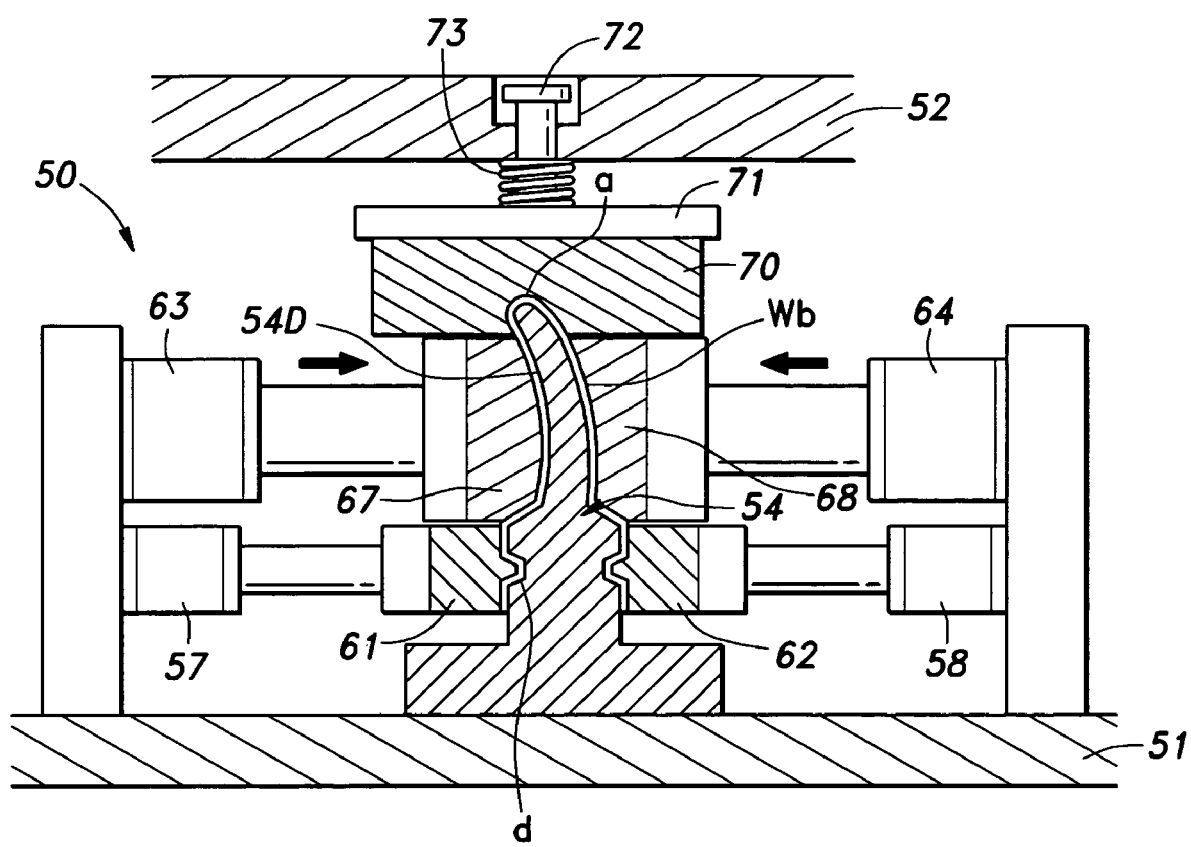
FIG. 6 is a vertical sectional view of the secondary press die assembly at a second intermediate position.

Finally, as shown in FIG. 6, the upper side clamp members 67 and 68 are actuated toward each other by the corresponding hydraulic cylinders 63 and 64 until the free ends 67A and 68A of the side clamp members 67 and 68 abut the planar portions of the preformed work piece Wb and push them against the corresponding side faces 54D and 54E of the main part of the punch 54. This causes the planar portions b and c of the preformed work piece Wb extending from either side of the bent portion a to be stretch formed into the desired three dimensional contour conforming to that of the blade to be protected. The preformed work piece Wb is removed from the die assembly, and extraneous parts such as the blank holder beads d are trimmed therefrom. This finally produces an edge protector 100 as illustrated in FIG. 7.

Because the stretch forming of the planar portions b and c is effected while the bent portion a is protected from deformation by the cooperation between the punch 54 and upper clamp member 70, the draw working of the bent portion a and stretch forming of the planar portions b and c can be achieved at high precision so as to closely conform to the corresponding contour of the blade to be protected without the two press forming processes interfering each other. Thereby, the edge protector can be manufactured at high precision both efficiently and economically.

Because the punch 54 is moveable relative to the lower die holder 51 along the plane of the punch mount surface 51A of the lower die holder 51 and the upper clamp member 70 is moveable relative to the upper die holder 52 along the plane of the lower surface 52A of the upper die holder 52, when the free ends 67A and 68A of the die blocks 67 and 68 are pushed onto the planar parts of the preformed work piece Wb against the two lateral sides 54D and 54E of the punch 54, the punch 54 is allowed to move along the punch mount surface 51A of the lower die holder 51 in such a manner that the free ends of the 67A and 68A of the die blocks 67 and 68 are made to exactly match the side surfaces 54D and 54E of the punch 54 in a complementary manner and the punch 54 is protected from any excessive lateral force.

Therefore, the free ends of the 67A and 68A of the die blocks 67 and 68 exactly align with the side surfaces 54D and 54E of the punch 54 with the planar sides of the preformed work piece Wb interposed between them while the bent portion a of the preformed work piece Wb is closely clamped between the recess of the upper clamp member 75 and the upper edge of the punch 54 so as to avoid any deformation of the bent portion a. These factors combine to allow the stretch forming of the preformed work piece Wb to be effectively so as to closely conform to the outer contour of the leading edge of the blade to be protected.

The side clamp members 61 and 62 and die blocks 67 and 68 may also be actuated by springs, electric motors or other know power actuators instead of the hydraulic cylinders. In the embodiment of the second press die assembly 50 illustrated in FIGS. 3 to 6, the side clamp members 61 and 62 and die blocks 67 and 68 were in effect supported by the lower die holder 51 via the upright side plates 55. However, it is only exemplary, and the side clamp members 61 and 62 and/or die blocks 67 and 68 may also be supported by the upper die holder 52.

In the foregoing description, it was assumed that the lower die holder and upper die holder are disposed as such. However, the specific naming of the relationship between the different parts is purely based on the convenience of description, and it is also possible to invert the relationship between the two parts or even place them laterally one next to the other without departing from the spirit of the present invention as can be readily appreciated by a person skilled in the art. It is also the case with the claims. The words such as "upper" and "lower" are intended to describe the relative relationships between different parts purely for the convenience of clarifying the language and are not intended to designate the orientation in any absolute sense. Therefore, it should be appreciated that the scope of claim of the present invention extends not only to the illustrated but also to other possible orientations such as those which are inverted or turned by any desired angle from that of the illustrated embodiment.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application and the contents of any related prior art mentioned in the disclosure are incorporated in this application by reference.

The invention claimed is:

1. A method for drawing sheet metal into an edge protector including a bent portion and a pair of planar portions conforming to a leading edge and a pair of lateral sides of a blade to be protected, respectively, the leading edge being given with a three dimensional contour, comprising:

press forming a piece of planar sheet metal into a preformed work piece having a U-shaped cross section by using a primary die assembly, the preformed work piece being provided with a bent portion extending along a longitudinal direction and a pair of planar portions extending from either side of the bent portion, the bent portion being given with a contour that conforms to the leading edge of the blade to be protected;

preparing a secondary die assembly including a punch including an upper edge portion and a pair of lateral sides conforming to the leading edge and lateral sides of the blade to be protected, respectively, at least a pair of lateral die blocks configured to cooperate with the lateral sides of the punch to shape the planar portions of the preformed work piece so as to conform to the lateral sides of the blade to be protected and an upper clamp member including a recess conforming to an outer contour of the bent portion of the preformed work piece and configured to clamp the bent portion of the preformed work piece in cooperation with the upper edge portion of the punch;

placing the preformed work piece onto the punch and clamping the preformed work piece between the upper edge portion of the punch and the recess of the upper clamp member;

pushing the lateral die blocks onto the planar portions of the preformed work piece against the corresponding lateral sides of the punch; and opening the secondary die assembly to take out the finally press formed work piece as a finished edge protector.

2. The method for drawing sheet metal into an edge protector according to claim 1, wherein the primary die assembly comprises an upper die holder and a lower die holder disposed opposite to each other and configured to be selectively moved toward and away from each other;

a punch mounted on the lower die holder and including an upper edge that is configured to form a substantially final configuration of the bent portion of the edge protector;

a blank holder having an opening to pass the punch therethrough and a clamping surface for clamping the blank sheet metal at parts corresponding to free ends of the planar portions of the edge protector;

at least a pair of lateral die blocks supported by the upper die holder so as to be slidable toward and away from lateral sides of the punch;

springs resiliently urging the die blocks toward each other; and actuators for causing movements of the upper die holder and lower die holder relative to each other.

3. The method for drawing sheet metal into an edge protector according to claim 2, wherein the blank sheet metal is placed on an upper surface of the blank holder so that a part of the blank sheet metal corresponding to the bent portion of the preformed work piece is aligned with the upper edge portion of the punch, and planar portions of the preformed work piece extending from either side of the part corresponding to the bent portion are each squeezed toward a base end of the punch between the corresponding lateral side of the punch and the corresponding lateral die block while the upper die holder along with the lateral die blocks are moved downward and the lateral die blocks are resiliently pushed toward the punch under a spring force of the spring.

4. The method for drawing sheet metal into an edge protector according to claim 3, wherein the blank holder of the primary die assembly comprises draw beads formed on an upper surface thereof for resiliently clamping the planar portions of the preformed work piece in cooperation with notches provided in the die blocks.

5. The method for drawing sheet metal into an edge protector according to claim 1, wherein the secondary die assembly further comprises an upper die holder and a lower die holder disposed opposite to each other and configured to be selectively moved toward and away from each other, the upper die holder supporting the upper clamp member, the lower die holder supporting the punch and lateral die blocks, and actuators for causing movements of the upper die holder and lower die holder relative to each other, and the lateral die blocks toward and away from the punch.

6. The method for drawing sheet metal into an edge protector according to claim 5, wherein the upper clamp block is supported by the upper die holder so as to be laterally moveable relative to the upper die holder.

7. The method for drawing sheet metal into an edge protector according to claim 5, wherein the punch is supported by the lower die holder so as to be laterally moveable relative to the lower die holder.

8. The method for drawing sheet metal into an edge protector according to claim 5, wherein the secondary die assembly further comprises a pair of lateral clamp members configured to push free ends of the planar portions of the preformed work piece against a base portion of the punch; and actuators for actuating the lateral clamp members toward and away from the base portion of the punch.

9. The method for drawing sheet metal into an edge protector according to claim 8, wherein the base portion of the punch and each of the clamp members abut each other via a complementary projection and groove engagement.

10. The method for drawing sheet metal into an edge protector according to claim 5, wherein the upper die holder comprises a spring member for resiliently urging the upper clamp block against the upper edge of the punch.

11. A primary die assembly for pre-forming a piece of planar sheet metal into a preformed work piece having a U-shaped cross section, the preformed work piece being provided with a bent portion extending along a longitudinal direction and a pair of planar portions extending from either side of the bent portion, the bent portion being given with a three dimensional contour that conforms to the leading edge of the blade to be protected, the primary die assembly comprising:

an upper die holder and a lower die holder disposed opposite to each other and configured to be selectively moved toward and away from each other;

a punch mounted on the lower die holder and including an upper edge that is configured to form a substantially final configuration of the bent portion of the edge protector;

a blank holder having an opening to pass the punch therethrough and a clamping surface for clamping blank sheet metal at parts corresponding to free ends of the planar portions of the edge protector;

at least a pair of lateral die blocks supported by the upper die holder so as to be slidable toward and away from lateral sides of the punch;

springs resiliently urging the die blocks toward each other; and actuators for causing movements of the upper die holder and lower die holder relative to each other.

12. The primary die assembly according to claim 1, wherein the blank holder of the primary die assembly comprises draw beads formed on an upper surface thereof for resiliently clamping the planar portions of the preformed work piece in cooperation with notches provided in the die blocks.

13. A secondary die assembly for forming an edge protector including a bent portion and a pair of planar portions conforming to a leading edge and a pair of lateral sides of a blade to be protected, respectively, the leading edge being given with a three dimensional contour, from a preformed work piece having a U-shaped cross section, the preformed work piece being provided with a bent portion extending along a longitudinal direction and a pair of planar portions extending from either side of the bent portion, the bent portion being given with a three dimensional contour that conforms to the leading edge of the blade to be protected while the planar portions are yet to be formed into final shapes, the primary die assembly comprising:

an upper die holder and a lower die holder disposed opposite to each other and configured to be selectively moved toward and away from each other;

a punch mounted on the lower die holder and including an upper edge portion and a pair of lateral sides conforming to the leading edge and lateral sides of the blade to be protected, respectively;

at least a pair of lateral die blocks supported by one of the upper die holder and lower die holder and configured to cooperate with the lateral sides of the punch to shape the planar portions of the preformed work piece so as to conform to the lateral sides of the blade to be protected;

an upper clamp member supported by the upper die holder and including a recess conforming to an outer contour of the bent portion of the preformed work piece and configured to clamp the bent portion of the preformed work piece in cooperation with the upper edge portion of the punch; and actuators for causing movements of the upper die holder and lower die holder relative to each other, and the lateral die blocks toward and away from the punch.

14. The secondary die assembly according to claim 13, wherein the upper clamp block is supported by the upper die holder so as to be laterally moveable relative to the upper die holder.

15. The secondary die assembly according to claim 13, wherein the punch is supported by the lower die holder so as to be laterally moveable relative to the lower die holder.

16. The secondary die assembly according to claim 13, further comprising a pair of lateral clamp members supported by one of the upper die holder and lower die holder and configured to push free ends of the planar portions of the preformed work piece against a base portion of the punch; and actuators for actuating the lateral clamp members toward and away from the base portion of the punch.

17. The secondary die assembly according to claim 16, wherein the base portion of the punch and each of the clamp members abut each other via a complementary projection and groove engagement.

18. The secondary die assembly according to claim 13, wherein the upper die holder comprises a spring member for resiliently urging the upper clamp block against the upper edge of the punch.

* * * * *